US011046054B2

(12) United States Patent
Jacquet

(10) Patent No.: US 11,046,054 B2
(45) Date of Patent: Jun. 29, 2021

(54) METHOD FOR PRODUCING A SANDWICH STRUCTURE

(71) Applicant: ArcelorMittal, Luxembourg (LU)

(72) Inventor: Denis Jacquet, Chamant (FR)

(73) Assignee: ArcelorMittal, Luxembourg (LU)

( * ) Notice: Subject to any disclaimer, the term of this patent is extended or adjusted under 35 U.S.C. 154(b) by 167 days.

(21) Appl. No.: 15/741,288

(22) PCT Filed: Jul. 7, 2016

(86) PCT No.: PCT/IB2016/000972
§ 371 (c)(1),
(2) Date: Jan. 1, 2018

(87) PCT Pub. No.: WO2017/006174
PCT Pub. Date: Jan. 12, 2017

(65) Prior Publication Data
US 2018/0200993 A1 Jul. 19, 2018

(30) Foreign Application Priority Data

Jul. 7, 2015 (WO) ................. PCT/IB2015/001135

(51) Int. Cl.
| B32B 41/00 | (2006.01) |
| B32B 15/08 | (2006.01) |
| B32B 15/18 | (2006.01) |
| B32B 27/32 | (2006.01) |
| B32B 27/34 | (2006.01) |
| B32B 33/00 | (2006.01) |
| B32B 15/20 | (2006.01) |
| B32B 7/12 | (2006.01) |
| B62D 29/00 | (2006.01) |

(52) U.S. Cl.
CPC .............. B32B 15/08 (2013.01); B32B 7/12 (2013.01); B32B 15/18 (2013.01); B32B 15/20 (2013.01); B32B 27/32 (2013.01); B32B 27/34 (2013.01); B32B 33/00 (2013.01); *B32B 2250/40* (2013.01); *B32B 2270/00* (2013.01); *B32B 2307/51* (2013.01); *B32B 2307/54* (2013.01); *B32B 2307/714* (2013.01); *B32B 2307/72* (2013.01); *B32B 2307/732* (2013.01); *B32B 2311/24* (2013.01); *B32B 2311/30* (2013.01);
(Continued)

(58) Field of Classification Search
CPC ......... B32B 15/08; B32B 33/00; B32B 15/20; B32B 7/12; B32B 15/18; B32B 27/32; B32B 27/34; B32B 2307/714; B32B 2311/24; B32B 2307/51; B32B 2250/40; B32B 2307/72; B32B 2307/732; B32B 2311/30; B32B 2605/08; B32B 27/28; B32B 37/16; B32B 2307/54; B32B 2270/00; B62D 29/001; B62D 29/005
USPC .................... 156/60, 64, 350, 351, 378, 379
See application file for complete search history.

(56) References Cited

U.S. PATENT DOCUMENTS

| 4,313,996 A | 2/1982 | Newman et al. |
| 4,601,941 A | 7/1986 | Lutz et al. |
| 8,470,111 B2 | 6/2013 | Boeger et al. |
| 2005/0142278 A1 | 6/2005 | Okada et al. |
| 2006/0269701 A1 | 11/2006 | Gauriat |
| 2007/0166526 A1 | 7/2007 | Myard et al. |
| 2015/0202844 A1 | 7/2015 | Boeger et al. |

FOREIGN PATENT DOCUMENTS

| CN | 104582951 A | 4/2015 |
| EP | 2570258 A1 | 3/2013 |

(Continued)

OTHER PUBLICATIONS

Partial translation of Alfutov N.A. "Calculation of multilayer plates and shells from composite materials" / N.A. Alfutov, P.A. Zinoviev, B.G. Popov.—M: Mashinostroenie, 1984.—264 pages (example 2 on p. 234-235), see partial English translation.

*Primary Examiner* — Michael N Orlando
*Assistant Examiner* — Joshel Rivera
(74) *Attorney, Agent, or Firm* — Davidson, Davidson & Kappel, LLC

(57) ABSTRACT

A process for manufacturing a sandwich structure including two steel skin layers separated by a polymeric layer is provided. The process includes dimensioning the sandwich structure according to a target to be attained by defining the target to be attained by three target values, i.e., tensile strength $T_c$ expressed in kN/mm, bending stiffness $B_c$ expressed in kN/mm, and surface mass $M_c$ expressed in $Kg/m^2$, defining a tolerance for the attainment of target values, defining the sandwich structure by five variables, i.e., the thickness $E_a$ of the steel skin layers expressed in mm, the polymeric layer thickness $E_p$ expressed in mm, the intrinsic Young's modulus $Y_p$ of the polymeric layer, the intrinsic density $d_p$ of the polymeric layer, and the volume ratio $R_p$ of the polymeric layer expressed as a volume percentage of the polymeric layer of the material, identifying the $E_a$, $E_p$, $Y_p$, $d_p$, and $R_p$ combinations enabling attainment of the target values having the defined tolerance, and determining, for each variable, an operating range. The process also includes selecting the steel and the polymeric layer for which each variable is within the range defined in the previous step and manufacturing the corresponding sandwich structure.

25 Claims, No Drawings

(52) U.S. Cl.
CPC ........ *B32B 2605/08* (2013.01); *B62D 29/001* (2013.01); *B62D 29/005* (2013.01)

(56) References Cited

FOREIGN PATENT DOCUMENTS

| | | | |
|---|---|---|---|
| JP | S60242052 A | 12/1985 | |
| JP | S6168242 A | 4/1986 | |
| JP | S63183837 A | 7/1988 | |
| JP | 2000225664 A | 8/2008 | |
| JP | 2009262434 A | 11/2009 | |
| RU | 2344041 C2 | 1/2009 | |
| WO | 2005014278 A1 | 2/2005 | |
| WO | WO-2012019233 A1 * | 2/2012 | ................ B23P 9/00 |
| WO | 2012076763 A1 | 6/2012 | |
| WO | 2013156166 A1 | 10/2013 | |

* cited by examiner ately by reducing the weight of these vehicles.
METHOD FOR PRODUCING A SANDWICH STRUCTURE The invention relates to sandwich structures including a polymeric layer between two steel skin layers and a process for manufacturing them.

BACKGROUND

Reducing motor vehicle energy consumption occurs primarily by reducing the weight of these vehicles.

The steel traditionally used for producing both skin parts and structural parts has lighter metal competitors such as aluminum and composites, such as glass fiber-reinforced polymers or carbon fiber-reinforced polymers.

Although sandwich structures can provide an alternative, their complexity makes their dimensioning difficult.

SUMMARY OF THE INVENTION

Thus, an object of the present invention is a method for manufacturing a sandwich structure that facilitates dimensioning of the sandwich structure according to a target to be achieved.

The present invention provides a method for manufacturing a sandwich structure including two steel skin layers separated by a polymeric layer comprising the steps of:
- dimensioning the sandwich structure according to a target to be attained by following the sub-steps of:
  - defining the target to be attained by three target values, i.e., tensile strength $T_c$ expressed in kN/mm, bending stiffness $B_c$ expressed in kN/mm, and surface mass $M_c$ expressed in Kg/m$^2$,
  - defining a tolerance for the attainment of target values,
  - defining the sandwich structure by five variables, i.e., the thickness $E_a$ of the steel skin layers expressed in mm, the polymeric layer thickness $E_p$ expressed in mm, the intrinsic Young's modulus $Y_p$ of the polymeric layer, the intrinsic density $d_p$ of the polymeric layer, and the volume ratio $R_p$ of the polymeric layer expressed as a volume percentage of the polymeric layer of the material,
  - identifying $E_a$, $E_p$, $Y_p$, $d_p$, and $R_p$ combinations enabling attainment of target values having the defined tolerance,
  - determining, for each variable, an operating range,
- selecting the steel and the polymeric layer for which each variable is within the range defined in the previous step,
- manufacturing the corresponding sandwich structure.

The method of the invention may also include the following optional features, either individually or in combination:
- the target to be attained is a monolithic metallic material other than steel,
- the target to be attained is aluminum,
- the target to be attained is aluminum with a thickness of 0.9 mm,
- the target to be attained is aluminum with a thickness of 0.8 mm,
- the tolerance in attaining target values is 10%,
- the step of identifying the $E_a$, $E_p$, $Y_p$, $d_p$, and $R_p$ combinations enabling attainment of the target values having the defined tolerance includes a step during which the $E_a$, $E_p$, $Y_p$, $d_p$, and $R_p$ combinations are generated,
- it includes a graphical analysis step for the $E_a$, $E_p$, $Y_p$, $d_p$, and $R_p$ combinations generated.

The present invention also provides a sandwich structure obtainable by the method for a 0.9 mm aluminum target with $T_c$=31.5 N/mm, $B_c$=10.2 N/mm, $M_c$=2.43 Kg/m$^2$ and a tolerance of 10%, the sandwich structure including:
- two steel skin layers with steel thickness $E_a$ between 0.133 mm and 0.165 mm,
- a polymeric layer intercalated between the two skin layers and having:
  - A thickness $E_p$ between ($-2.5\times Ea+0.713$) and ($-2.5\times Ea+0.88$),
  - a density $d_p$ between 0.9 and 1.4,
  - a volume fraction $R_p$ greater than or equal to 0.2 and strictly less than 1,
  - a Young's modulus $Y_p$ lower than 4000 MPa,
  - where the volume fraction $R_p$ and the Young's modulus $Y_p$ satisfy the inequality:

$$Y_p*(0.49*R_p^2+0.23*R_p+1/(Y_p*(1-R_p)))\geq 50 \text{ MPa}$$

This sandwich structure according to the invention may also include the following optional features, either individually or in combination:
- the steel thickness $E_a$ is between 0.141 mm and 0.158 mm and the polymeric layer thickness $E_p$ is between ($-2.5\times E_a+0.73$) and ($-2.5\times E_a+0.87$),
- the polymeric layer includes a mixture of a polyamide and a copolymer of ethylene and unsaturated carboxylic acid and/or its derivative.

The present invention further provides a sandwich structure obtainable by the method for a 0.8 mm aluminum target with $T_c$=28.0 N/mm, $B_c$=7.2 N/mm, $M_c$=2.16 Kg/m$^2$ and a tolerance of 10%, the sandwich structure including:
- two steel skin layers with steel thickness $E_a$ between 0.118 mm and 0.146 mm,
- a polymeric layer intercalated between the two skin layers and having:
  - a thickness $E_p$ between ($-2.5\times E_a+0.632$) et ($-2.5\times E_a+0.75$),
  - a density $d_p$ between 0.9 and 1.4,
  - a volume fraction $R_p$ greater than or equal to 0.2 and strictly less than 1,
  - a Young's modulus $Y_p$ lower than 4000 MPa,
  - where the volume fraction $R_p$ and the Young's modulus $Y_p$ satisfy the inequality:

$$Y_p*(0.49*R_p^2+0.23*R_p+1/(Y_p*(1-R_p)))\geq 50 \text{ MPa}$$

This sandwich structure according to the invention may also include the following optional features, either individually or in combination:
- the steel thickness $E_a$ is between 0.126 mm and 0.140 mm and the polymeric layer thickness $E_p$ is between ($-2.5\times E_a+0.646$) and ($-2.5\times E_a+0.728$),
- the mixture of a polyamide and a copolymer of ethylene and unsaturated carboxylic acid and/or its derivative.

DETAILED DESCRIPTION

Other features and advantages of the invention appear in the description that follows.

The dimensioning of a sandwich structure starts with the selection of a target to be attained. This target can be either a virtual target defined uniquely by target values or a competing product for which replication of the performance is sought. In the latter case, the target values are those of the competing material under consideration.

In particular, the target to be attained is defined by three target values, i.e., tensile strength $T_c$ expressed in kN/mm, bending stiffness $B_c$ expressed in kN/mm, and surface mass $M_c$ expressed in Kg/m$^2$.

By way of non-limiting examples, in the case of aluminum as a target, the target values $T_c$, $B_c$, and $M_c$ respectively may have the following values:

31.5 N/mm, 10.2 N/mm, 2.43 Kg/m² for 0.9 mm aluminum 28.0 N/mm, 7.2 N/mm, 2.16 Kg/m² for 0.8 mm aluminum When dimensioning the sandwich structure, a tolerance margin in the attainment of target values is allowed. This tolerance can be adjusted on a case-by-case basis by a person skilled in the art in accordance with the criticality of the target value in the given context.

For example, a first approach might be to accept that the target values are attained to within plus or minus 10%, or preferentially within plus or minus 5%.

The sandwich structure is then defined by the thickness $E_a$ of the steel skin layers expressed in mm, the thickness $E_p$ of the polymeric layer expressed in mm, the intrinsic Young's modulus $Y_p$ of the polymeric layer, the intrinsic density $d_p$ of the polymeric layer expressed in MPa, and the volume fraction $R_p$ of the polymeric layer expressed as a volume percentage of the polymeric layer of the material.

Intrinsic Young's modulus of the polymeric layer means the Young's modulus of the polymer or polymer mixture constituting the polymeric layer, excluding foaming, if any, of the polymeric layer.

Intrinsic density of the polymer layer means the density of the polymer or polymer mixture constituting the polymer layer, excluding fillers and foaming, if any, in the density calculation.

The volume fraction $R_p$ is a function of the foaming, if any, of the polymeric layer. In the absence of foaming, the volume ratio is therefore 1. The control of the volume fraction is attained by controlling the foaming rate. Preferably, the polymeric layer is foamed, i.e., $R_p$ is strictly less than 1. Foaming provides a better compromise for weight reduction/mechanical performance of the sandwich structure.

The next step is to identify $E_a$, $E_p$, $Y_p$, $d_p$, and $R_p$ combinations enabling attainment of target values having the defined tolerance.

This step can be implemented according to any method known to a person skilled in the art.

By way of a non-limiting example, a possible method is described below. The first step of this method is to generate $E_a$, $E_p$, $Y_p$, $d_p$, and $R_p$ combinations as follows:

the Young's modulus $Y_{a1}$ of the first steel skin layer is set to 210000 MPa, the size of the first metal skin layer is set to a width $I_{a1}$ of 50 mm and a length $L_{a1}$ of 100 mm, the Poisson coefficient vat of the first steel skin layer is set to 0.3, the size of the polymeric layer is set to a width $I_p$ of 50 mm and a length $L_p$ of 100 mm, the Poisson coefficient $v_p$ of the polymeric layer is set to 0.3, the thickness $E_{a2}$ of the second steel skin layer is set to that of the first skin layer, the Young modulus $Y_{a2}$ of the second steel skin layer is set to 210000 MPa, the size of the second steel skin layer is set to a width $I_{a2}$ of 50 mm and a length $L_{a2}$ of 100 mm, the Poisson coefficient $v_{a2}$ of the second steel skin layer is set to 0.3, the thickness $E_{a1}$ of the first steel skin layer is randomly varied, preferably between 0.1 mm and 0.2 mm to limit the number of iterations, the polymeric layer thickness $E_p$ is varied randomly, preferably between 0 and 1 mm to limit the number of iterations, the intrinsic Young's modulus $Y_p$ of the polymeric layer is randomly varied, the volume fraction $R_p$ of the polymeric layer is randomly varied, the intrinsic density $d_p$ of the polymer layer is randomly varied, the first steel skin layer quadratic moment of inertia $MM4_{a1}$ is calculated using the equation $MM4_{a1}=I_a*E_{a1}^3/12$, the first steel skin layer shear modulus $Gc_{a1}$ is calculated using the equation $Gc_{a1}=Y_{a1}/(2*(1+v_{a1}))$, the first skin layer neutral fiber $NF_{a1}$ is calculated using the equation $Gc_{a1}=E_{a1}/2$, the mass $M_{a1}$ of the first steel skin layer is calculated using the equation $M_{a1}=E_{a1}*7.8$, the apparent Young's modulus $Yapp_p$ of the polymeric layer is calculated using the equation $Yapp_p=Y_p*(0.7^2*R_p^2+(1-0.77)*R_p+1/(Y_p*(1-R_p)))$ the quadratic moment of inertia $MM4_p$ of the polymeric layer is calculated using the equation $MM4_p=I_p*E_p^3/12$, the shear modulus $Gc_p$ of the polymeric layer is calculated using the equation $Gc_p=Yapp_p/(2*(1+v_p))$, the neutral fiber $NF_p$ of the polymeric layer is calculated using the equation $NF_p=E_p/2+E_{a1}$, the mass $M_p$ of the polymeric layer is calculated using the equation $M_p=R_p*E_p*d_p$, the quadratic moment of inertia $MM4_{a2}$ of the second steel skin layer is calculated using the equation $MM4_{a2}=I_{a2}*E_{a2}^3/12$, the shear modulus $Gc_{a2}$ of the second steel skin layer is calculated using the equation $Gc_{a2}=Y_{a2}/(2*(1+v_{a2}))$, the second skin layer $NF_{a2}$ neutral fiber is calculated using the equation $NF_{a2}=E_{a2}/2+E_p+E_{a1}$, the mass $M_{a2}$ of the second steel skin layer is calculated using the equation $M_{a2}=E_{a2}*7.8$, the sandwich structure bending stiffness $B_s$ is calculated using the equation:

$$B_s=1/(L_{a2}^3/(48*A)+L_{a2}/(4*D))$$

Where:

$$A=(Y_{a1}*MM4_{a1}+E_{a1}*Y_{a1}*I_a*(Gc_{a1}-C)^2)+\\(Yapp_p*MM4_p+E_p*Yapp_p*I_p*(NF_p-C)^2)+\\(Y_{a2}*MM4_{a2}+E_{a2}*Y_{a2}*I_{a2}*(NF_{a2}-C)^2)$$

And $D=I_p*Gc_p*((E_{a1}+E_{a2})/2+E_p)^2/E_p$

Where:

$$C=(E_{a1}*Y_{a1}I_a*Gc_{a1}+E_p*Yapp_p*I_p*NF_p+\\E_{a2}*Y_{a2}*I_{a2}*NF_{a2})/(E_{a1}*Y_{a1}I_a+E_p*Yapp_p*I_p+\\E_{a2}*Y_{a2}*I_{a2}),$$

the tensile strength $T_s$ of the sandwich structure is calculated using the equation:

$$T_s=50/100*(Y_{a1}*E_{a1}+Yapp_p*E_p+Y_{a2}*E_{a2})/1000$$

the mass $M_s$ of the sandwich structure is calculated using the equation:

$$M_s=M_{a1}+M_p+M_{a2},$$

$T_s$, $B_s$, and $M_s$ are compared to the target values for $T_c$, $B_c$, and $M_c$ with the defined tolerance.

The results obtained are analyzed so as to identify $E_a$, $E_p$, $Y_p$, $d_p$, and $R_p$ combinations allowing the attainment of target values having the defined tolerance. In particular, the results can be analyzed graphically. By way of example, the graph may show a representation of the polymeric layer thickness $E_p$ as a function of the thickness $E_a$ of the steel skin layer and the intrinsic Young's modulus $Y_p$ of the polymeric layer. The graph may also show a representation of the polymeric layer thickness $E_p$ as a function of the thickness $E_a$ of the steel skin layer and the volume fraction $R_p$ of the polymeric layer.

During the process of identifying $E_a$, $E_p$, $Y_p$, $d_p$, and $R_p$ combinations enabling attainment of target values having the defined tolerance, certain combinations can be excluded because they have been identified as not working.

By way of example, this is the case for sandwich structures with a polymeric layer apparent Young's modulus below 50 Mpa. Below this value, it has been observed that the development of the Young's modulus over time becomes overly sensitive to the environment. In particular, water infiltration or exposure of the sandwich structure to temperatures close to the melting point of the polymeric layer may lead to shearing of the sandwich structure and loss of cohesion.

Similarly, it has been found that a volume fraction less than 0.2, i.e., a foaming proportion of more than 80%, does not allow sufficient rigidity of the sandwich structure to be attained and/or maintained.

By way of example, for a 0.9 mm aluminum target with $T_c$=31.5 N/mm, $B_c$=10.2 N/mm, $M_c$=2.43 Kg/m², and a tolerance of 10%, an operating range is determined as defined by:
  a steel thickness $E_a$ between 0.133 mm and 0.165 mm,
  a thickness $E_p$ of the polymeric layer between (−2.5×$E_a$+ 0.713) and (−2.5×$E_a$+0.88),
  a density $d_p$ of the polymeric layer between 0.9 and 1.4,
  a volume ratio $R_p$ of the polymeric layer between 0.2 and 1,
  a Young's modulus $Y_p$ of the polymeric layer lower than 4000 MPa,
  where the volume fraction $R_p$ and the Young's modulus $Y_p$ satisfy the inequality:

$$Y_p*(0.49*R_p^2+0.23*R_p+1/(Y_p*(1-R_p)))\geq 50 \text{ MPa}$$

Similarly, for a 0.9 mm aluminum target with $T_c$=31.5 N/mm, $B_c$=10.2 N/mm, $M_c$=2.43 Kg/m², and a tolerance of 5%, the operating range is defined by:
  a steel thickness $E_a$ between 0.141 mm and 0.158 mm,
  a thickness $E_p$ of the polymeric layer between (−2.5×Ea+ 0.73) and (−2.5×Ea+0.87).
  a density $d_p$ of the polymeric layer between 0.9 and 1.4,
  a volume ratio $R_p$ of the polymeric layer between 0.2 and 1,
  a Young's modulus $Y_p$ of the polymeric layer lower than 4000 MPa, where the volume fraction $R_p$ and the Young's modulus $Y_p$ satisfy the inequality:

$$Y_p*(0.49*R_p^2+0.23*R_p+1/(Y_p*(1-R_p)))\geq 50 \text{ MPa}.$$

Similarly, for a 0.8 mm aluminum target with $T_c$=28.0 N/mm, $B_c$=7.2 N/mm, $M_c$=2.16 Kg/m², and a tolerance of 10%, the operating range is defined by
  a steel thickness $E_a$ between 0.118 mm and 0.146 mm,
  a thickness $E_p$ of the polymeric layer between (−2.5×Ea+ 0.632) and (−2.5×Ea+0.75).
  a density $d_p$ between of the polymeric layer between 0.9 and 1.4,
  a volume ratio $R_p$ of the polymeric layer between 0.2 and 1,
  a Young's modulus $Y_p$ of the polymeric layer lower than 4000 MPa,
  where the volume fraction $R_p$ and the Young's modulus $Y_p$ satisfy the inequality:

$$Y_p*(0.49*R_p^2+0.23*R_p+1/(Y_p*(1-R_p)))\geq 50 \text{ MPa}.$$

Similarly, for a 0.8 mm aluminum target with $T_c$=28.0 N/mm, $B_c$=7.2 N/mm, C $M_c$=2.16 Kg/m² and a tolerance of 10%, the operating range is defined by:
  a steel thickness $E_a$ between 0.126 mm and 0.140 mm,
  a thickness $E_p$ of the polymeric layer between (−2.5×$E_a$+ 0.646) and (−2.5×$E_a$+0.728),
  a density $d_p$ of the polymeric layer between 0.9 and 1.4,
  a volume ratio $R_p$ of the polymeric layer between 0.2 and 1,
  a Young's modulus $Y_p$ of the polymeric layer lower than 4000 MPa,
  where the volume fraction $R_p$ and the Young's modulus $Y_p$ satisfy the inequality:

$$Y_p*(0.49*R_p^2+0.23*R_p+1/(Y_p*(1-R_p)))\geq 50 \text{ MPa}.$$

The next step is to select the steel and the polymeric layer for which each variable is within the range defined in the previous step.

A person skilled in the art, who is knowledgeable about the characteristics of steels and polymers, can easily make this selection.

In particular, the selection of the steel is guided by the considerations below.

Preferably, the skin layer is made of sheet steel with thickness $E_a$ between 0.1 mm and 0.2 mm. Below this range, it becomes difficult to achieve sufficient bending stiffness of the sandwich structure. Above this range, the weight of the steel sheets does not allow for a sufficiently light sandwich structure. Preferably, steel sheets have a thickness between 0.118 mm and 0.165 mm. Even more preferably, steel sheets have a thickness between 0.126 mm and 0.158 mm.

The selection of steel grade depends on the intended application. For use in the automotive industry, the grades commonly used are ES grades (EN DC01 to DC06) and HLE grades (EN H240LA to H400LA). Preferably, steels are selected from the IF-Ti grades. These grades have the advantage of being very insensitive to hardening after curing (bake hardening) which allows them to undergo the manufacturing stage of the sandwich structure without damage, a stage during which the sandwich structure is heated to temperatures in the range of 240° C.-250° C. These grades also have the advantage of being capable of undergoing deep-drawing.

These steel skin layers can be bare. Alternatively, they can be coated in order to improve their performance, in particular their corrosion resistance. In the case of coated steel, steel thickness $E_a$ means the thickness of the bare steel skin layer, without taking into consideration the thickness of the coating.

The coating may be a metal coating obtained by hot dip galvanizing, electroplating, or vacuum deposition, such as vapor deposition or sonic vapor jet deposition. This coating may include one or more metals such as zinc, aluminum, magnesium, or silicon. By way of non-limiting examples, we can cite zinc coating (GI), alloyed zinc coating (GA), zinc alloy with 0.1 wt-% to 10 wt-% magnesium (ZnMg), zinc alloy with 0.1 wt-% to 10 wt-% magnesium and 5 wt-% to 11 wt-% aluminum (ZnAlMg), zinc alloy with 5 wt-% aluminum (Galfan®), zinc alloy with 55 wt-% aluminum, about 1.5 wt-% silicon, the remainder being zinc and unavoidable impurities due to processing (Aluzinc®, Galvalume®), aluminum alloy having 8 wt-% to 11% wt-% silicon and 2 wt-% to 4 wt-% iron, the remainder being aluminum and unavoidable impurities due to processing (Alusi®), and aluminum coating (Alupur®).

The coating may also include a surface treatment, varnish, or paint or oil coating. These coatings are known to the person skilled in the art, who will know how to use them and how to adjust them on a case-by-case basis.

A person skilled in the art will also be guided in the selection of a polymeric layer by the considerations below.

The polymeric layer can be composed of a single polymer or a mixture of at least two polymers (polymeric mixture below).

The selection of the polymer or the polymeric mixture is mainly guided by the conditions existing for the polymer or the polymer blend during the manufacture and use of the sandwich structure.

For this reason, a polymer or polymer mixture should preferably be selected which:
  has a melting point not exceeding 220° C.-240° C. so that it can be used on sandwich structure production lines without excessive heating,
  is resistant to the cataphoresis stage, a stage in motor vehicle manufacturing during which paint applied to the vehicle is cured for about 45 minutes at a temperature of up to 210° C.

Preferably, the polymeric layer has sufficient adhesion to the metal to be used as a monolayer directly attached to the steel skin layers during manufacturing of the sandwich structure. Alternatively, the polymeric layer can be attached to steel skin layers by means of a glue or adhesive at the polymeric layer/steel skin layer interface. Alternatively, the polymeric layer may be a multilayer, the outer layers of which have good adhesion to metal.

According to a variant of the invention, the polymeric mixture includes a polyamide such as PA6, PA6-6, PA11, PA12, PA4-6, PA6-10, or PA6-12, for which the densities and the Young's modulus are known. Preferably, the polymer mixture comprises a polyamide and a copolymer of ethylene and unsaturated carboxylic acid and/or its derivative. Details for the characteristics of the components of such a mixture and the process for obtaining this mixture can be found in application WO2005/0142278 incorporated by reference herein. These polyamide-based mixtures have the advantage of being resistant to the cataphoresis stage, having a good surface appearance after shaping, and having good adhesion to metal.

According to a variant of the invention, the polymeric mixture is biphasic and comprises:
  a polyamide having a melting point of not more than 210° C.;
  a modified polyolefin having carboxy groups,
  whose rheological behavior in the molten state is characterized by the existence of a threshold stress.

Details of the characteristics of the components of such a mixture and the process for obtaining this mixture can be found in application WO2012/076763 incorporated by reference herein.

Such a polymeric mixture has the advantage of resisting the cataphoresis step at 210° C. while having a melting point that does not exceed 210° C., which facilitates its implementation and therefore the manufacturing of the sandwich structure.

The polymer layer can be foamed.

The presence of gas bubbles in the mixture may result either from the incorporation of a blowing agent into the polymer mixture or from the physical introduction of gas bubbles into the mixture during processing.

If a blowing agent is used, it should preferably be incorporated during manufacture of the polymer or polymer mixture. During sandwich panel manufacturing, heating of the polymeric layer activates the blowing agent which releases gas into the polymer. The foaming rate, and thus the $R_p$ volume ratio, is then controlled by the amount of blowing agent added to the polymeric layer. Among the blowing agents that can be used, by way of example, Expancel® microspheres can be cited, which are added at a level of a few weight percent to the polymeric layer.

Manufacturing itself, i.e. the assembly of the skin layers and the polymeric layer, can be carried out according to any process known to a person skilled in the art.

What is claimed is:

1. A method for manufacturing a sandwich structure comprising two steel skin layers separated by a polymeric layer comprising steps of:
  dimensioning the sandwich structure according to a target to be attained by following the sub-steps of:
  defining the target by three target values including tensile strength $T_c$ expressed in kN/mm, bending stiffness $B_c$ expressed in kN/mm, and surface mass $M_c$ expressed in Kg/m$^2$;
  defining a tolerance for the three target values;
  defining the sandwich structure by five variables including thickness $E_a$ of the steel skin layers expressed in mm, a polymeric layer thickness $E_p$ expressed in mm, an intrinsic Young's modulus $Y_p$ of the polymeric layer, an intrinsic density $d_p$ of the polymeric layer, and a volume ratio $R_p$ of the polymeric layer expressed as a volume percentage of the polymeric layer of the material;
  identifying the $E_a$, $E_p$, $Y_p$, $d_p$, and $R_p$ combinations enabling attainment of the three target values having the defined tolerance; and
  determining, for each variable, an operating range;
  providing the two steel skin layers and the polymeric layer for which each variable is within the range defined in the previous step such that the provided two skin layers have a thickness $E_{a1}$ and $E_{a2}$ respectively, and such that the provided polymeric layer has a thickness $E_{p1}$, an intrinsic Youngs modulus $Y_{p1}$, an intrinsic density $d_{p1}$ and a volume ratio $R_{p1}$; and
  attaching the provided polymeric layer having the thickness $E_{p1}$, the intrinsic Youngs modulus $Y_{p1}$, the intrinsic density $d_{p1}$ and the volume ratio $R_{p1}$ to the provided two skin layers having the thicknesses $E_{a1}$ and $E_{a2}$ so that the provided polymeric layer is sandwiched between the provided steel skin layers to form the sandwich structure having the three target values $T_c$, $B_c$, and $M_c$ having the defined tolerance.

2. The manufacturing method according to claim 1, wherein the target to be attained is a monolithic metallic material other than steel.

3. The manufacturing method according to claim 2, wherein the target to be attained is aluminum.

4. The manufacturing method according to claim 3, wherein the target to be attained is aluminum with a thickness of 0.9 mm.

5. The manufacturing method according to claim 3, wherein the target to be attained is aluminum with a thickness of 0.8 mm.

6. The manufacturing method according claim 1, wherein the tolerance in attaining target values is 10%.

7. The manufacturing method according to claim 1, wherein the step of identifying the $E_a$, $E_p$, $Y_p$, $d_p$, and $R_p$ combinations enabling attainment of the target values having the defined tolerance includes a step during which the $E_a$, $E_p$, $Y_p$, $d_p$, and $R_p$ combinations are generated.

8. The manufacturing method according to claim 7, further comprising a graphical analysis step for the $E_a$, $E_p$, $Y_p$, $d_p$, and $R_p$ combinations generated.

9. A sandwich structure obtainable by the process according to claim 1 implemented for a 0.9 mm aluminum target with $T_c$=31.5 N/mm, $B_c$=10.2 N/mm, $M_c$=2.43 Kg/m² and a tolerance of 10%, for a sandwich structure including:
   two steel skin layers with steel thickness $E_a$ between 0.133 mm and 0.165 mm;
   a polymeric layer intercalated between the two skin layers and having:
      a thickness $E_p$ between (−2.5×Ea+0.713) and (−2.5×Ea+0.88),
      a density $d_p$ between 0.9 and 1.4,
      a volume fraction $R_p$ greater than or equal to 0.2 and strictly less than 1,
      a Young's modulus $Y_p$ lower than 4000 MPa, and
      where the volume fraction $R_p$ and the Young's modulus $Y_p$ satisfy the inequality: $Y_p*(0.49*R_p^2+0.23*R_p+1/(Y_p*(1-R_p)))≥50$ MPa.

10. The sandwich structure according to claim 9, wherein the steel thickness $E_a$ is between 0.141 mm and 0.158 mm and the thickness $E_p$ of polymeric layer is between (−2.5×$E_a$+0.73) and (−2.5×$E_a$+0.87).

11. The sandwich structure according to claim 9, wherein the polymeric layer includes a mixture of a polyamide and a copolymer of ethylene and unsaturated carboxylic acid or a derivative thereof.

12. A sandwich structure obtainable by the process according to claim 1 for a 0.8 mm aluminum target with $T_c$=28.0 N/mm, $B_c$=7.2 N/mm, $M_c$=2.16 Kg/m² and a tolerance of 10%, with the sandwich structure comprising:
   two steel skin layers with steel thickness $E_a$ between 0.118 mm and 0.146 mm;
   a polymeric layer intercalated between two skin layers and having:
      a thickness $E_p$ between (−2.5×$E_a$+0.632) and (−2.5×$E_a$+0.75),
      a density $d_p$ between 0.9 and 1.4,
      a volume fraction $R_p$ greater than or equal to 0.2 and strictly less than 1,
      a Young's modulus $Y_p$ lower than 4000 MPa,
      where the volume fraction $R_p$ and the Young's modulus $Y_p$ satisfy the inequality: $Y_p*(0.49*R_p^2+0.23*R_p+1/(Y_p*(1-R_p)))≥50$ MPa.

13. The sandwich structure according to claim 12, wherein the steel thickness $E_a$ is between 0.126 mm and 0.140 mm and the polymeric layer thickness Ep is between (−2.5×Ea+0.646) and (−2.5×Ea+0.728).

14. The sandwich structure according to claim 12, wherein the polymeric layer includes a mixture of a polyamide and a copolymer of ethylene and unsaturated carboxylic acid or a derivative thereof.

15. The manufacturing method according to claim 1, wherein the target is a 0.9 mm aluminum target with $T_c$=31.5 N/mm, $B_c$=10.2 N/mm, $M_c$=2.43 Kg/m² and a tolerance of 10%, and the corresponding sandwich structure includes the two steel skin layers with steel thickness $E_a$ between 0.133 mm and 0.165 mm and includes the polymeric layer having:
   a thickness $E_p$ between (−2.5×Ea+0.713) and (−2.5×Ea+0.88),
   a density $d_p$ between 0.9 and 1.4,
   a volume fraction $R_p$ greater than or equal to 0.2 and strictly less than 1,
   a Young's modulus $Y_p$ lower than 4000 MPa, and
   where the volume fraction $R_p$ and the Young's modulus $Y_p$ satisfy the inequality: $Y_p*(0.49*R_p^2+0.23*R_p+1/(Y_p*(1-R_p)))≥50$ MPa.

16. The manufacturing method according to claim 15, wherein the steel thickness $E_a$ is between 0.141 mm and 0.158 mm and the thickness $E_p$ of polymeric layer is between (−2.5×$E_a$+0.73) and (−2.5×$E_a$+0.87).

17. The manufacturing method according to claim 15, wherein the polymeric layer includes a mixture of a polyamide and a copolymer of ethylene and unsaturated carboxylic acid or a derivative thereof.

18. The manufacturing method according to claim 1, wherein the target is a 0.8 mm aluminum target with $T_c$=28.0 N/mm, $B_c$=7.2 N/mm, $M_c$=2.16 Kg/m² and a tolerance of 10%, and the corresponding sandwich structure includes the two steel skin layers with steel thickness $E_a$ between 0.118 mm and 0.146 mm and includes the polymeric layer having:
   a thickness $E_p$ between (−2.5×$E_a$+0.632) and (−2.5×$E_a$+0.75),
   a density $d_p$ between 0.9 and 1.4,
   a volume fraction $R_p$ greater than or equal to 0.2 and strictly less than 1,
   a Young's modulus $Y_p$ lower than 4000 MPa,
   where the volume fraction $R_p$ and the Young's modulus $Y_p$ satisfy the inequality: $Y_p*(0.49*R_p^2+0.23*R_p+1/(Y_p*(1-R_p)))≥50$ MPa.

19. The manufacturing method according to claim 18, wherein the steel thickness $E_a$ is between 0.126 mm and 0.140 mm and the polymeric layer thickness Ep is between (−2.5×Ea+0.646) and (−2.5×Ea+0.728).

20. The manufacturing method according to claim 18, wherein the polymeric layer includes a mixture of a polyamide and a copolymer of ethylene and unsaturated carboxylic acid or a derivative thereof.

21. The manufacturing method according to claim 1, further comprising coating the sandwich structure.

22. The manufacturing method according to claim 21 wherein the coating is a metal coating.

23. The manufacturing method according to claim 1, wherein the polymeric layer is foamed.

24. The manufacturing method according to claim 23, wherein the foamed polymeric layer includes microsphere blowing agents.

25. The manufacturing method according to claim 1, wherein the polymeric layer is manufactured using a polymeric mixture is biphasic and includes a polyamide and a modified polyolefin.

* * * * *